(12) United States Patent
Liu et al.

(10) Patent No.: US 10,554,133 B2
(45) Date of Patent: *Feb. 4, 2020

(54) ADAPTIVE BURST GENERATION FOR USE WITH A DC-OUTPUT CONVERTER

(71) Applicant: Texas Instruments Incorporated, Dallas, TX (US)

(72) Inventors: Pei-Hsin Liu, Westford, MA (US); Bing Lu, Bedford, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,075

(22) Filed: Feb. 14, 2019

(65) Prior Publication Data

US 2019/0181762 A1     Jun. 13, 2019

Related U.S. Application Data

(63) Continuation of application No. 15/786,378, filed on Oct. 17, 2017, now Pat. No. 10,243,469.

(51) Int. Cl.
*H02M 3/335* (2006.01)
*H02M 1/08* (2006.01)
*H05B 33/08* (2020.01)
*H02M 3/24* (2006.01)
*H02M 1/42* (2007.01)
(Continued)

(52) U.S. Cl.
CPC ......... *H02M 3/33507* (2013.01); *H02M 1/08* (2013.01); *H02M 1/42* (2013.01); *H02M 3/24* (2013.01); *H02M 3/33569* (2013.01); *H05B 33/0815* (2013.01); *H02J 3/01* (2013.01);
(Continued)

(58) Field of Classification Search
CPC ..... H02M 2001/0035; H02M 3/33515; H02M 3/33523; H02J 3/01
USPC ....... 323/21.12, 21.13, 21.15, 21.18, 39, 78, 323/79; 363/21.12, 21.13, 21.15, 21.18, 363/39, 78, 79
See application file for complete search history.

(56) References Cited

U.S. PATENT DOCUMENTS

8,519,688 B2 * 8/2013 Halberstadt ........... H02M 3/156 323/222
9,331,591 B2 * 5/2016 Leisten ............. H02M 3/33523
(Continued)

*Primary Examiner* — Gary A Nash
(74) *Attorney, Agent, or Firm* — Tuenlap Chan; Charles A. Brill; Frank D. Cimino (57) ABSTRACT

These teachings apply with respect to a direct current (DC)-output converter and provide for adjusting a number of switching pulses per burst cycle as a function, at least in part, of converter output loading. This adjustment can be made by controlling burst frequency with respect to at least one predetermined threshold frequency. The predetermined threshold frequency can comprise a non-audible frequency such that the number of switching pulses is adjusted to prevent the burst frequency from itself constituting an audible signal. The adjustment of the number of switching pulses per burst cycle may only occur when the output loading is less than a predetermined level of loading. These teachings may also provide for clamping the pulse frequency for the pulses in each burst package to a particular value when dynamically controlling the number of pulses in each burst package. The aforementioned particular value may constitute, for example, a highest available switching frequency.

17 Claims, 7 Drawing Sheets

(51) Int. Cl.
*H02M 1/00* (2006.01)
*H02J 3/01* (2006.01)

(52) U.S. Cl.
CPC .... *H02M 3/33515* (2013.01); *H02M 3/33523* (2013.01); *H02M 2001/0035* (2013.01)

(56) References Cited

U.S. PATENT DOCUMENTS

| | | | | |
|---|---|---|---|---|
| 2003/0042879 | A1* | 3/2003 | Huh | H02M 3/33523 323/282 |
| 2009/0284994 | A1* | 11/2009 | Lin | H02M 3/335 363/21.13 |
| 2014/0016362 | A1* | 1/2014 | Adragna | H02M 3/3376 363/21.02 |
| 2015/0244274 | A1* | 8/2015 | Fahlenkamp | H02M 3/33507 363/21.15 |
| 2016/0190920 | A1* | 6/2016 | Halberstadt | H02M 3/33523 323/282 |

* cited by examiner

FIG. 9

ADAPTIVE BURST GENERATION FOR USE WITH A DC-OUTPUT CONVERTER

CROSS REFERENCE TO RELATED APPLICATIONS

Under 35 U.S.C. § 120, this continuation application claims benefits of and priority to U.S. patent application Ser. No. 15/786,378 (TI-77465), filed on Oct. 17, 2017, the entirety of which are hereby incorporated herein by reference.

TECHNICAL FIELD

These teachings relate generally to flyback converters and more particularly to flyback converters that employ burst mode control.

BACKGROUND

Flyback converters are known in the art and are used in both AC/DC and DC/DC conversion. Flyback converters typically have a buck-boost converter with the inductor split to form a transformer so that the voltage ratios are multiplied with an additional advantage of isolation. When a switch closes, the primary of the transformer directly connects to an input voltage source. The primary current and magnetic flux in the transformer increases, storing energy in the transformer. The voltage induced in the secondary winding is negative, so a corresponding diode is reverse-biased (and hence is blocked). An output capacitor then supplies energy to the output load. When that switch opens the primary current and magnetic flux drops. The secondary voltage is positive and forward-biases the diode, allowing current to flow from the transformer. The energy from the transformer core recharges the capacitor and supplies the load.

Government, industry, and user concerns emphasize high energy efficiency for devices such as AC/DC converters. Some flyback converters employ active clamped flyback to attempt to meet such requirements. Such an approach can achieve some improved efficiency by eliminating switching losses on its switching devices with zero voltage switching (ZVS) capability. Unfortunately, efficiency can still drop off significantly when the converter becomes more lightly loaded, since additional reactive energy from the transformer is needed to perform ZVS (and especially when loading drops to less than fifty percent).

A so-called burst mode of operation can help to improve efficiency for a lightly-loaded flyback converter that employs active clamped flyback. Unfortunately, such a solution can give rise to other problems. As one example in these regards, burst mode control can introduce higher output ripples that in turn require using an oversized output capacitor. As another example in these regards, burst mode control can introduce lower burst frequencies that themselves introduce relatively high audible noise.

BRIEF DESCRIPTION OF THE DRAWINGS

The above needs are at least partially met through provision of adaptive burst generation for use with a DC-output converter apparatus and method described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

SUMMARY

Generally speaking, these various embodiments are configured to apply with respect to a direct current (DC)-output converter including both alternating current (AC)-to-DC converters and DC-to-DC converters. These teachings provide for adjusting a number of switching cycles per burst as a function, at least in part, of converter output loading. This adjustment can be made by controlling burst frequency with respect to at least one predetermined threshold frequency. By one approach the predetermined threshold frequency comprises a non-audible frequency such that the number of switching cycles is adjusted in a way that prevents the burst frequency from itself constituting an audible signal.

By one approach the aforementioned adjustment of the number of switching cycles per burst only occurs when the output loading is less than a predetermined level of loading. At higher levels of loading amplitude modulation can be employed as per prior art practice in these regards.

By one approach these teachings also provide for clamping the pulse frequency for the pulses in each burst package to a particular value when dynamically controlling the number of pulses in each burst package. The aforementioned particular value may constitute, for example, a highest available switching frequency.

So configured, application of these teachings can yield a number of benefits. In particular, these teachings greatly reduce or eliminate prior issues concerning burst output ripple and audible noise and also provide better light load efficiency without requiring considerably larger capacitors that typify prior art approaches. These teachings will also permit triggering a burst mode of operation at heavier loads and packing more switching pulses for increased efficiency over a wider load range. It will also be appreciated that these teachings are flexible in practice and, for example, can be applied for both conventional flyback and active clamped flyback topologies.

DETAILED DESCRIPTION

Figure 1:
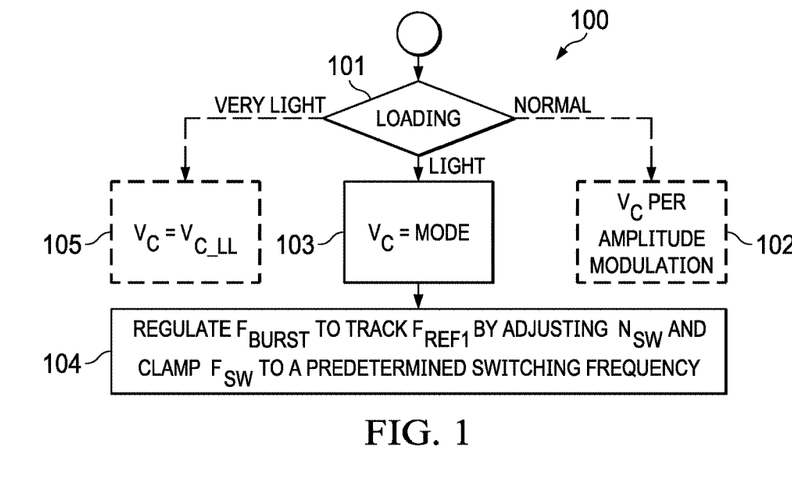
FIG. 1 comprises a flow diagram as configured in accordance with various embodiments of these teachings.

FIG. 1 presents a process 100 that generally accords with these teachings. That said, it will be understood that this process 100 as described includes certain specifics for the sake of an illustrative example but that such specific details are not necessarily essential to the practice of these teachings.

Generally speaking, at block 101 these teachings provide for responding differently to different loading levels for a DC-output converter. In particular, "normal" loading levels can be handled using one approach while lighter-than-normal loading levels are handled using a second, different approach. In this example these differences in approach are represented, in part, as a function of $V_C$ which represents a control voltage used to control peak switching current flowing through a sensing resistor corresponding to the converter. As shown at block 102, during normal loading conditions this control voltage $V_C$ is itself controlled using amplitude modulation techniques that accord with well understood prior art technique in these regards. (Those techniques being well known, further elaboration is not presented here in those regards.)

As shown at block 103, under light loading conditions (for example, at 50 percent loading or less) this process 100 sets $V_C$ to a predetermined value designated herein as MODE. At block 104 this process 100 then provides for regulating the burst frequency $F_{burst}$ for an adaptive burst generator described herein to cause the latter to approximate a reference frequency $F_{ref1}$ and therefore remain above audible frequencies by adjusting the number $N_{sw}$ of pulse width modulation switching signal pulses (that serve to control the on and off state for a semiconductor switch on the low side of the corresponding converter) PWML in a given burst cycle. At the same time, the switching frequency $F_{sw}$ for the PWML pulses is clamped to a predetermined switching frequency such as a highest available switching frequency.

Further details in these regards appears below. If desired, at very lightly loaded conditions (such as only 10 percent or less loading), and as denoted by optional block 105, these teachings will accommodate further reducing $V_C$ from MODE to a lower setpoint denoted here as $V_{C\_LL}$. This modification to the adaptive burst mode control approach disclosed herein can occur, for example, when $N_{sw}=1$ and $f_{burst}=f_{ref1}$. When utilizing this particular approach this process 100 can accommodate again setting $V_c$ to MODE from $V_{c\_LL}$ when $N_{sw}=1$ and $f_{sw}=f_{ref2}$.

Figure 2:
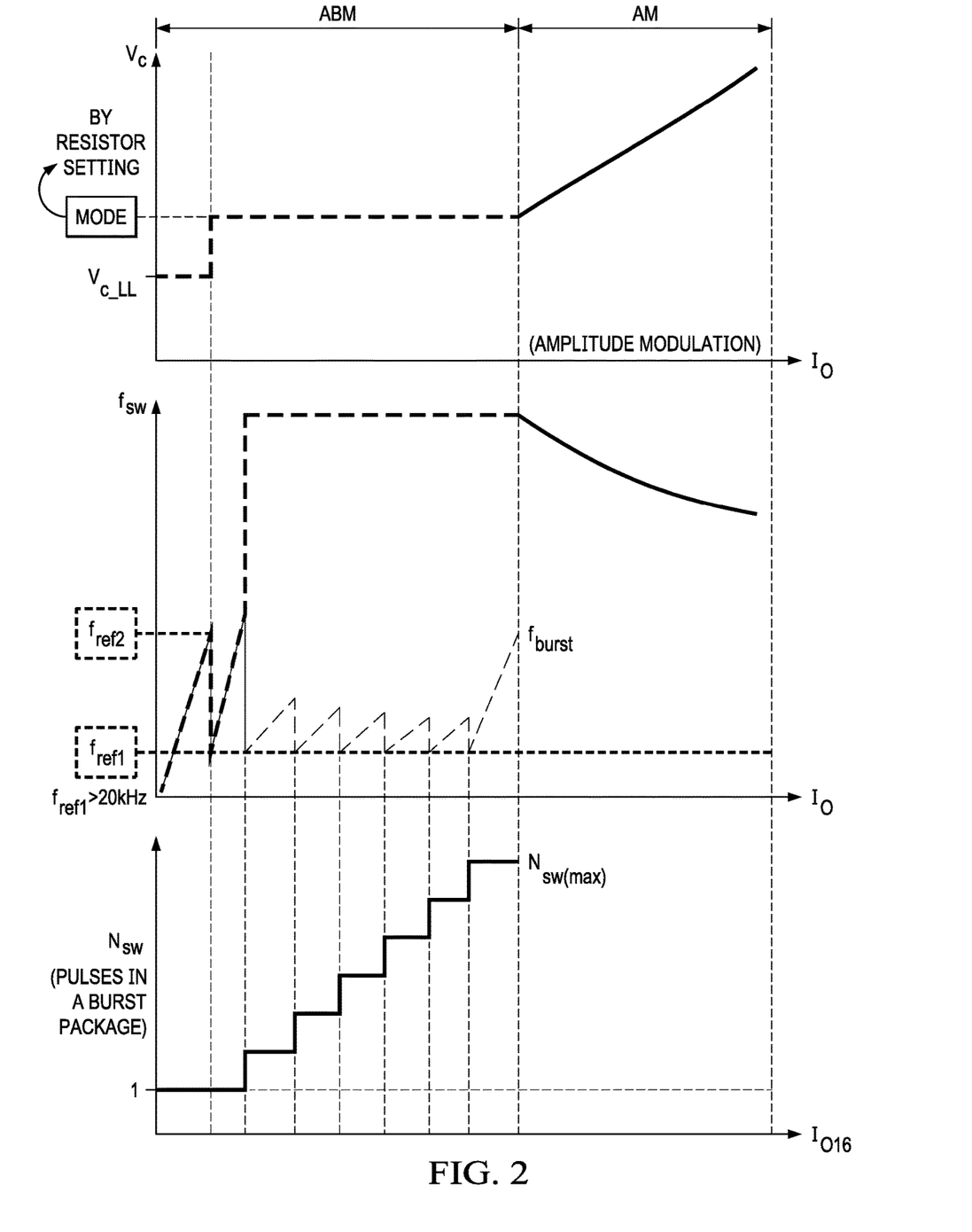
FIG. 2 comprises timing diagrams as configured in accordance with various embodiments of these teachings.
Figure 3:
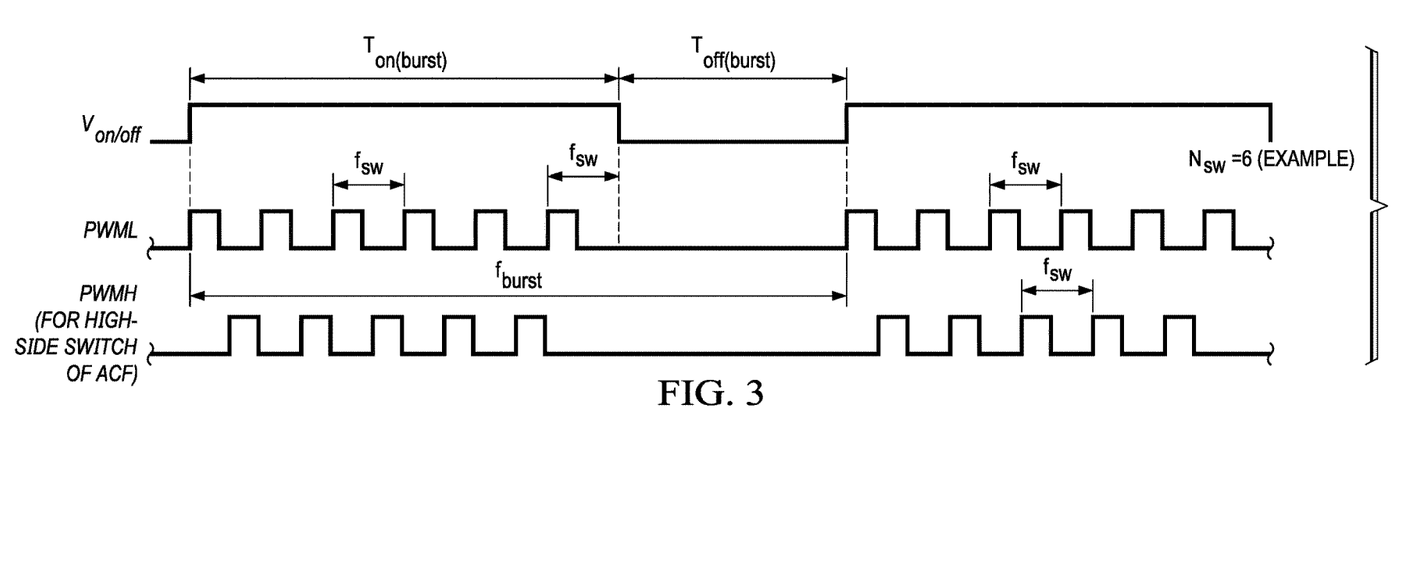
FIG. 3 comprises timing diagrams as configured in accordance with various embodiments of these teachings.

Illustrative examples in the foregoing regards are well represented in FIGS. 2 and 3 and will be further referenced in context with the operational description appearing below. (FIGS. 2 and 3 are drawn in vertical alignment such that, for example, vertically aligned leading and trailing pulse edges in fact represent such temporal alignment in an operating circuit.) To ensure clarity as regards nomenclature employed herein, the following expressions will be understood to have the following corresponding meanings.

ACF—Active Clamped Flyback (one available and illustrative converter topology for an AC/DC or DC/DC converter)

Burst—a signal burst that contains a specific number of grouped switching pulses (in these cases PWML and PWMH) that regulate the output power of the converter $F_{burst}$—burst frequency (measured, for example, in hertz and which constitutes the inverse of the burst period $T_{burst}$ that represents the cycle or periodicity of $V_{on/off}$)

$f_{sw}$—switching frequency (measured, for example, in hertz and which constitutes the inverse of the switching period $T_{sw}$ that represents the cycle or periodicity of PWML and PWMH)

$N_{sw}$—the number of PWML pulses in a burst period

Figure 4:
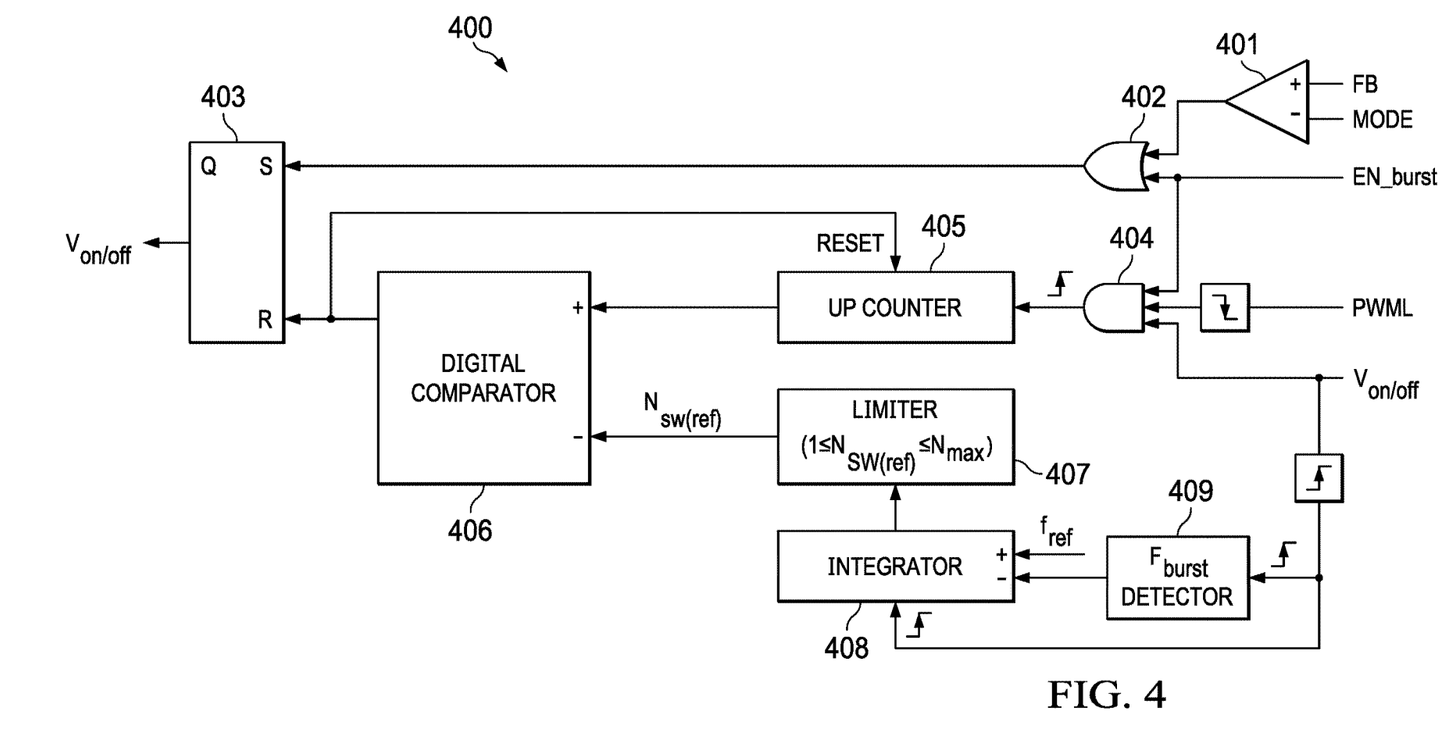
FIG. 4 comprises a block diagram as configured in accordance with various embodiments of these teachings.
Figure 5:
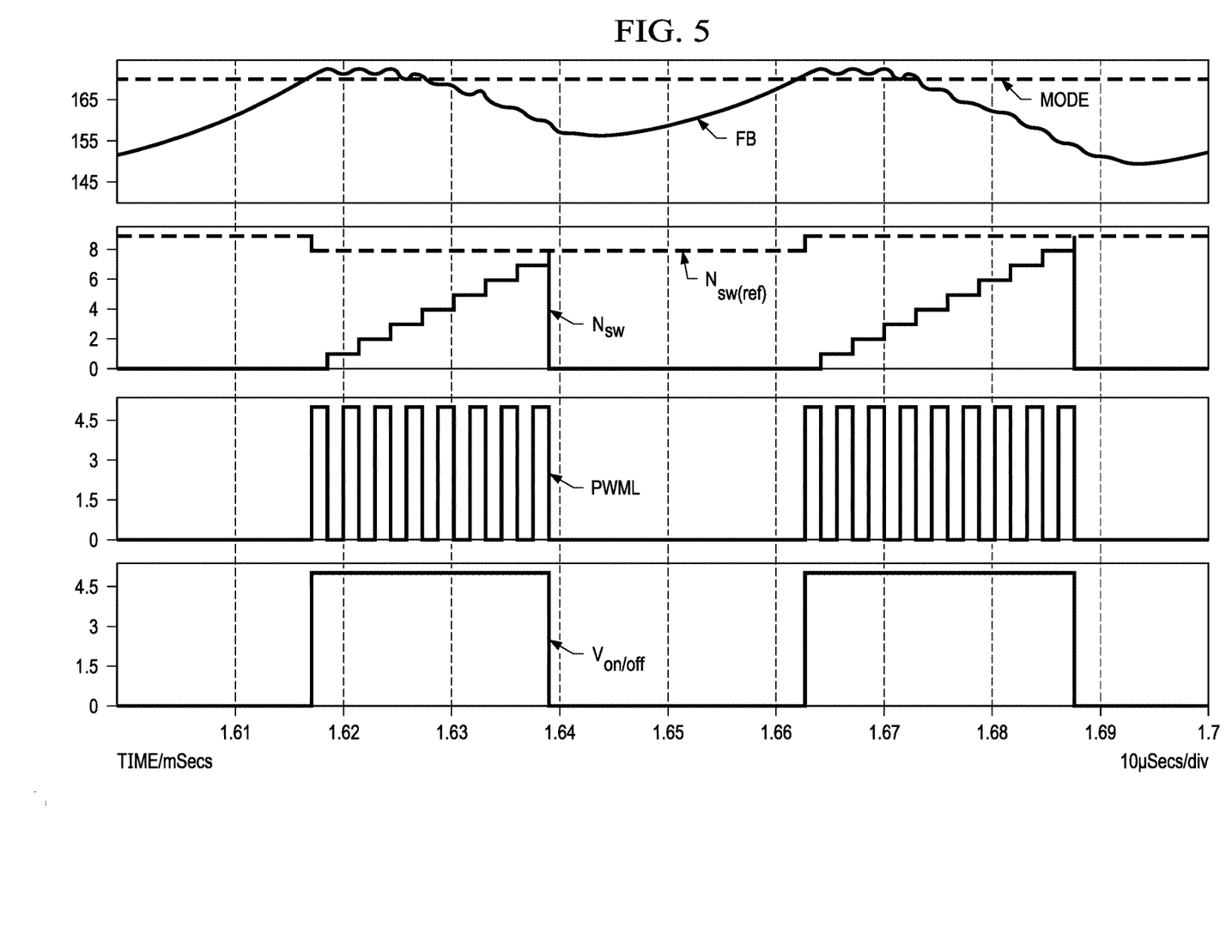
FIG. 5 comprises timing diagrams as configured in accordance with various embodiments of these teachings.

PWML—the switching signal used to control the on and off state for the semiconductor switch on the low side of a converter PWMH—the switching signal used to control the on and off state for the semiconductor switch on the high side of a converter $T_{on(burst)}$ the on time of the $V_{on/off}$ signal $T_{off(burst)}$ the time of the $V_{on/off}$ signal $V_{on/off}$—a voltage control signal used to determine the number of PWM pulses sent out to the semiconductor switch within the $T_{on(burst)}$ window of each burst period Referring now to FIGS. 4 and 5, an illustrative example of an adaptive burst generator 400 configured in accordance with these teachings will be described.

A comparator 401 compares the aforementioned MODE signal with a feedback signal FB provided by the voltage regulator that comprises a part of the corresponding converter. FIG. 2 provides an illustrative example for a $V_C$ signal. In particular, FIG. 2 illustrates that the $V_C$ signal can have a first (lowest) value ($V_{C\text{-}LL}$) if desired, the aforementioned "MODE" value that corresponds as described herein to the Adaptive Burst Mode (ABM) state of operation, and finally a ramped value that corresponds as described herein to an Amplitude Modulation (AM) state of operation.

The output of this comparator 401 couples to the input of an OR gate 402, the remaining input of which receives an EN_burst signal (described below). The output of this OR gate 402 couples to the set input of a flip-flop 403, the output of which provides the aforementioned $V_{on/off}$ signal. FIG. 3 presents an illustrative example in these regards where the $V_{on/off}$ signal toggles between an "on" state corresponding to the illustrated $T_{on(burst)}$ voltage level and an "off" state corresponding to the illustrated $T_{off(burst)}$ voltage level. As noted above, and as well illustrated in FIG. 3, this $V_{on/off}$ signal constitutes a voltage control signal that determines the number of Pulse Width Modulation (PWM) pulses (in this case, PWML signals and/or PWMH signals (to be applied, for example, to a high-side switch of an Active Clamped Flyback (ACF) component) sent out to a switch within the $T_{on(burst)}$ window of each burst period.

An AND gate 404 receives the aforementioned EN_burst signal, the aforementioned PWML signal (see FIGS. 3 and 5), and the aforementioned $V_{on/off}$ signal. The output of the AND gate 404 couples to an UP counter 405 having an output that couples to the positive input of a digital comparator 406. The output of the latter then couples to the reset input of the UP counter 405 and to the reset port of the aforementioned flip-flop 403. With this signal chain, the UP counter 405 calculates the total pulse count of PWML for every burst cycle, when $V_{on/off}$ and EN_burst go high. The total pulse number for a burst cycle is sent to the positive input of the digital comparator 406 to compare with a reference maximum pulse number. The negative input of the digital comparator 406 receives a signal corresponding to $N_{swf(ref)}$ (see FIGS. 3 and 5) as provided by a limiter 407. $N_{sw(ref)}$ is a reference value corresponding, in this case, to the maximum value for $N_{sw}$ (which refers, at noted above, to the maximum number of PWML pulses in a burst period (see FIG. 2 as well)) that can range between "1" and $N_{max}$. The limiter 407, in turn, receives input from an integrator 408 that receives the $V_{on/off}$ signal, an $f_{ref}$ signal (see FIG. 2), and the output from an $F_{burst}$ detector 409 that itself responds to the $V_{on/off}$ signal (where the $F_{burst}$ signal output by the detector 409 represents the burst frequency and therefore constitutes the inverse of the burst period $T_{burst}$ that represents the periodicity of the $V_{on/off}$ signal). With this signal chain, when the PWML pulse number from the UP counter 405 reaches the target $N_{sw(ref)}$ at the output of the limiter 407, $V_{on/off}$ will go low and reset the UP counter 405 to prepare for recounting the PWML pulses of the next burst cycle.

At the same time, the $F_{burst}$ detector 409 calculates the burst frequency of this burst cycle to compare with the target audible noise-free burst frequency $f_{ref}$. When the digital integrator 408 determines that the burst frequency is less than $f_{ref}$, $N_{sw(ref)}$ reduces by one to be the maximum pulse count of the next burst cycle. On the other hand, when the comparison result of the digital integrator 408 indicates that the burst frequency is higher than $f_{ref}$, $N_{sw(ref)}$ increases by one to be the maximum pulse count of the next burst cycle. (The limiter 407 constrains the output of the digital integrator 408 to only be able to provide $N_{sw(ref)}$ within a controllable range of ABM to the digital comparator 406.

FIG. 5 presents an illustrative view of various input, output, and intermediary signals and waveforms at various points within the adaptive burst generator 400 in temporal synchronicity with one another for a given set of illustrative operating conditions.

Figure 6:
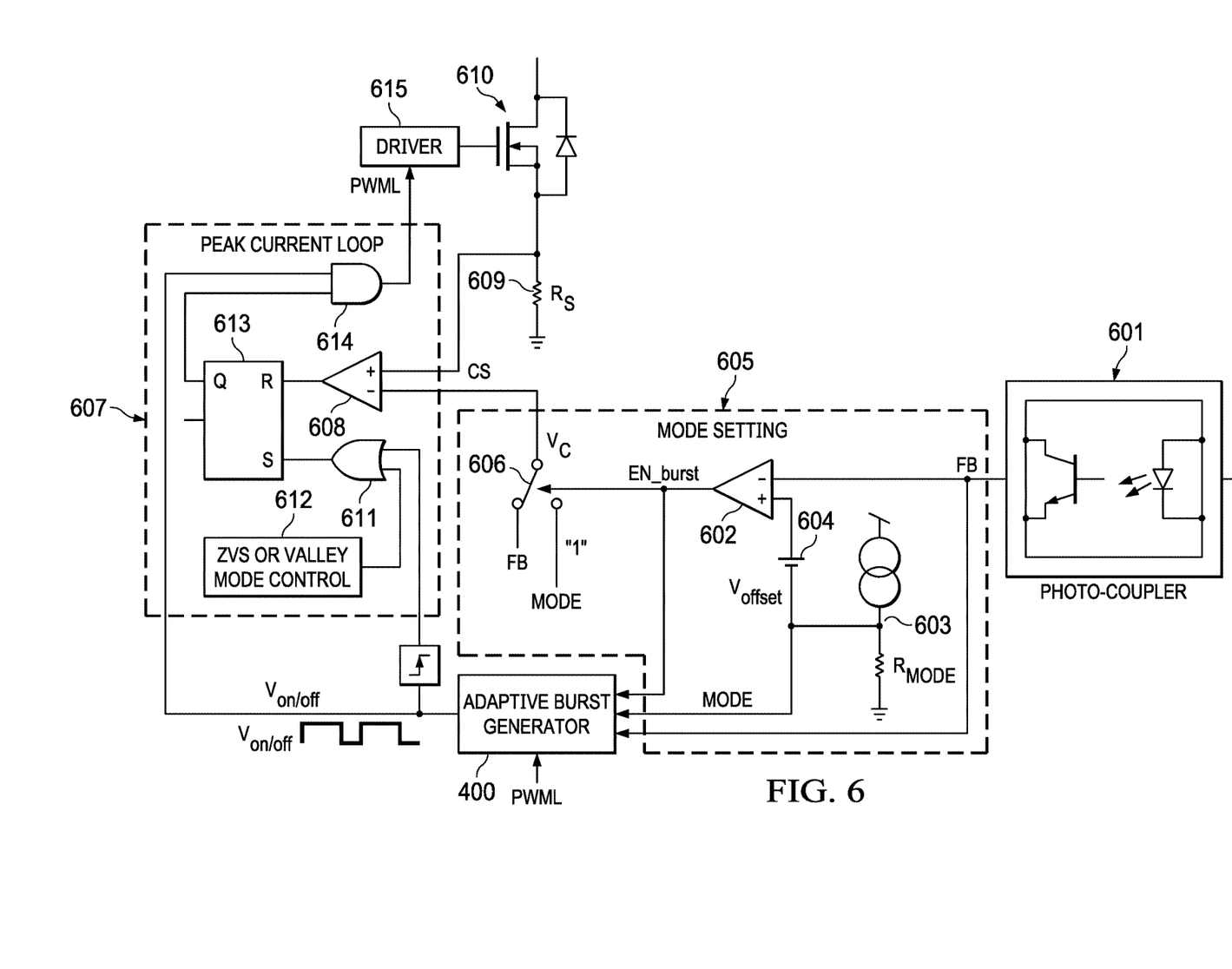
FIG. 6 comprises a block diagram as configured in accordance with various embodiments of these teachings.

FIG. 6 presents the adaptive burst generator 400 in an illustrative application setting. In this illustrative example the voltage regulator (not shown) of the converter couples through a photo coupler 601 to provide the aforementioned FB signal to both the adaptive burst generator 402 and a comparator 602. A resistor circuit 603 provides the aforementioned MODE signal to both the adaptive burst generator 400 and to the remaining input of the aforementioned comparator 602 via a capacitor 604.

The above-described comparator 602 and resistor circuit 603 are part of a mode setting circuit 605 that includes a switch 606 that responds to the EN_burst signal provided by the comparator 602. This switch 606, in this illustrative example, sets the $V_c$ control voltage to be either the FB signal or the static MODE value as a function of the EN_burst signal.

That $V_C$ control voltage and the $V_{on/off}$ signal output of the adaptive burst generator 400 are provided to a peak current loop 607. In particular, the $V_C$ control voltage couples to an input of a comparator 608, the remaining input of which receives a signal CS corresponding to the voltage across a sense resistor 609 that detects the switch state of a corresponding semiconductor switch 610 that comprises a part of the converter. The $V_{on/off}$ signal, in turn, couples to an input of an OR gate 611. The remaining input of that OR gate 611 couples to a zero-voltage switch (ZVS) mode control circuit 612 (sometimes also referred to as a valley mode control circuit). Such switches are known in the art and serve to deliver a quantized packet of energy to the converter output with switching occurring at zero voltage to thereby essentially comprise a lossless switch. As such switches are known in the art, further elaboration in these regards is not provided here.

The output of the OR gate 611 couples to the set input of a flip-flop 613, the reset port of which couples to the output of the aforementioned peak current loop comparator 608.

The output of the flip-flop 613 in turn couples to one input of an AND gate 614, the remaining input of which receives the $V_{on/off}$ signal from the adaptive burst generator 400. The output of this AND gate 614 provides the aforementioned PWML signal to a driver 615 that couples and corresponds to the aforementioned semiconductor switch 610.

The aforementioned control voltage $V_c$ serves to control the peak switching current flowing through the aforementioned sense resistor 609. That $V_c$, in turn, is set by the mode setting circuit 605 described above as a function of the EN_burst signal. When the EN_burst signal is low, $V_c$ tracks the voltage signal FB from the converter voltage regulator. When the EN_burst signal is high, $V_c$ clamps to a programmable voltage signal referred to herein as the MODE signal.

As noted above, under extremely light loading conditions $V_c$ can be clamped instead to $V_{c\_LL}$, the latter being a fixed value that is lower than the MODE clamping voltage. Lowering the $V_c$ clamping voltage when the converter is only very lightly loaded further reduces the peak switching current to thereby further reduce output ripple and audible noise. In general practice, a ratio of 3 to 1 or 4 to 1 can be useful to designate the range between a highest possible $V_c$ during the amplitude modulation mode of operation and the setting of $V_{c\_LL}$ during use of the adaptive burst generator 400.

Figure 7:
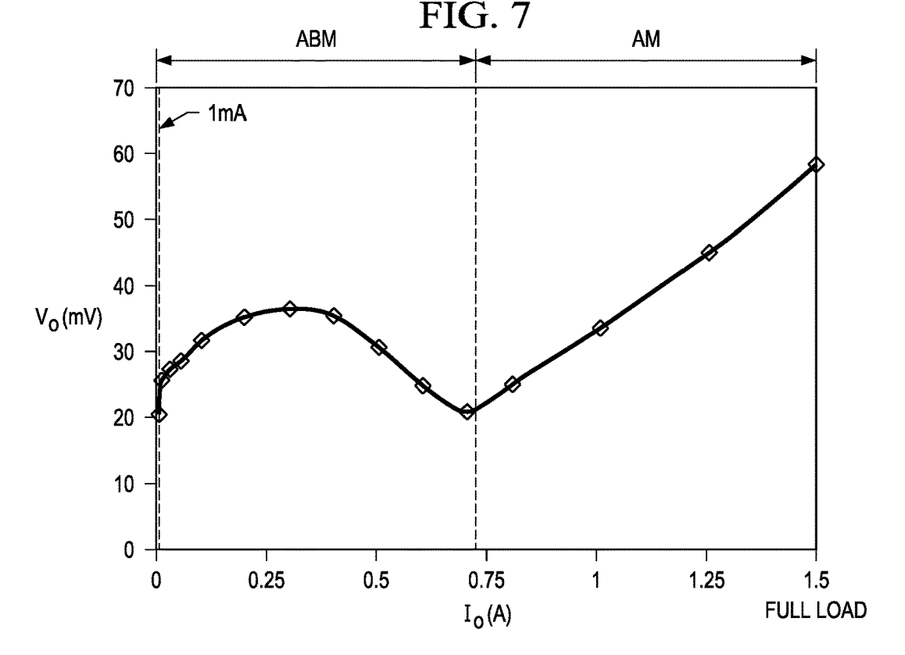
FIG. 7 comprises a graph as configured in accordance with various embodiments of the invention.
Figure 8:
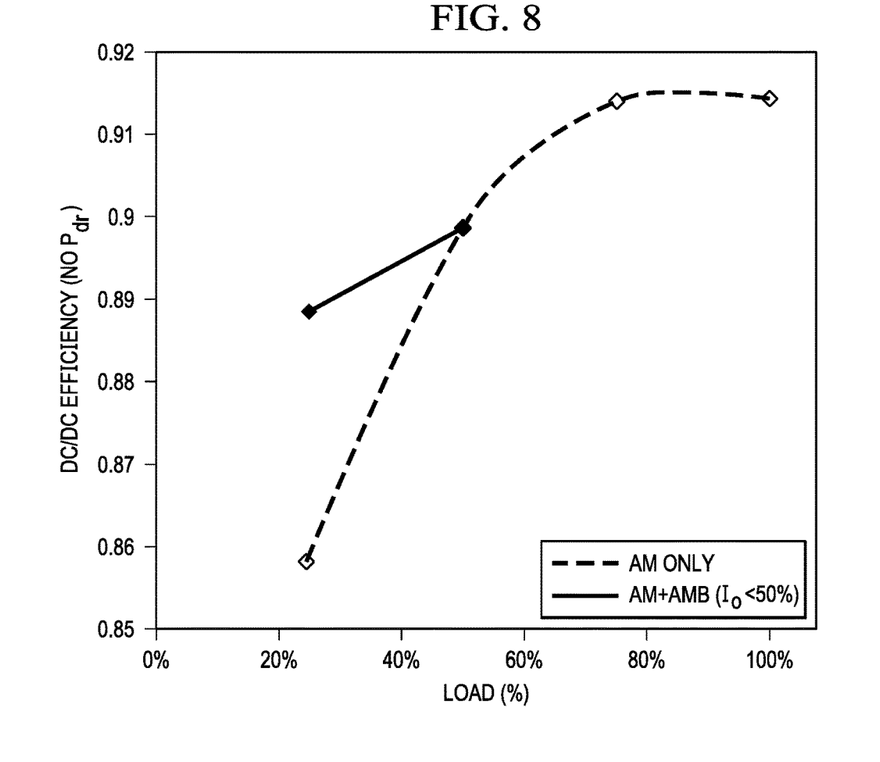
FIG. 8 comprises a graph as configured in accordance with various embodiments of these teachings.

So configured, and as well illustrated in FIG. 7, the adaptive burst generator 400 limits burst ripple to something less than ripple that occurs at full load, thereby avoiding a need to oversize a corresponding output capacitor for the converter. This adaptive burst generator 400 also provides fast model transition and enables high bandwidth design to further support and permit reduced output capacitor size. Those skilled in the art will appreciate that these teachings enable smooth mode jumping and thereby avoid undue transients and other disturbances. And as well illustrated in FIG. 8, experimental verification for the described use of adaptive burst generation indeed leads to increased efficiency at lower levels of loading.

Figure 9:
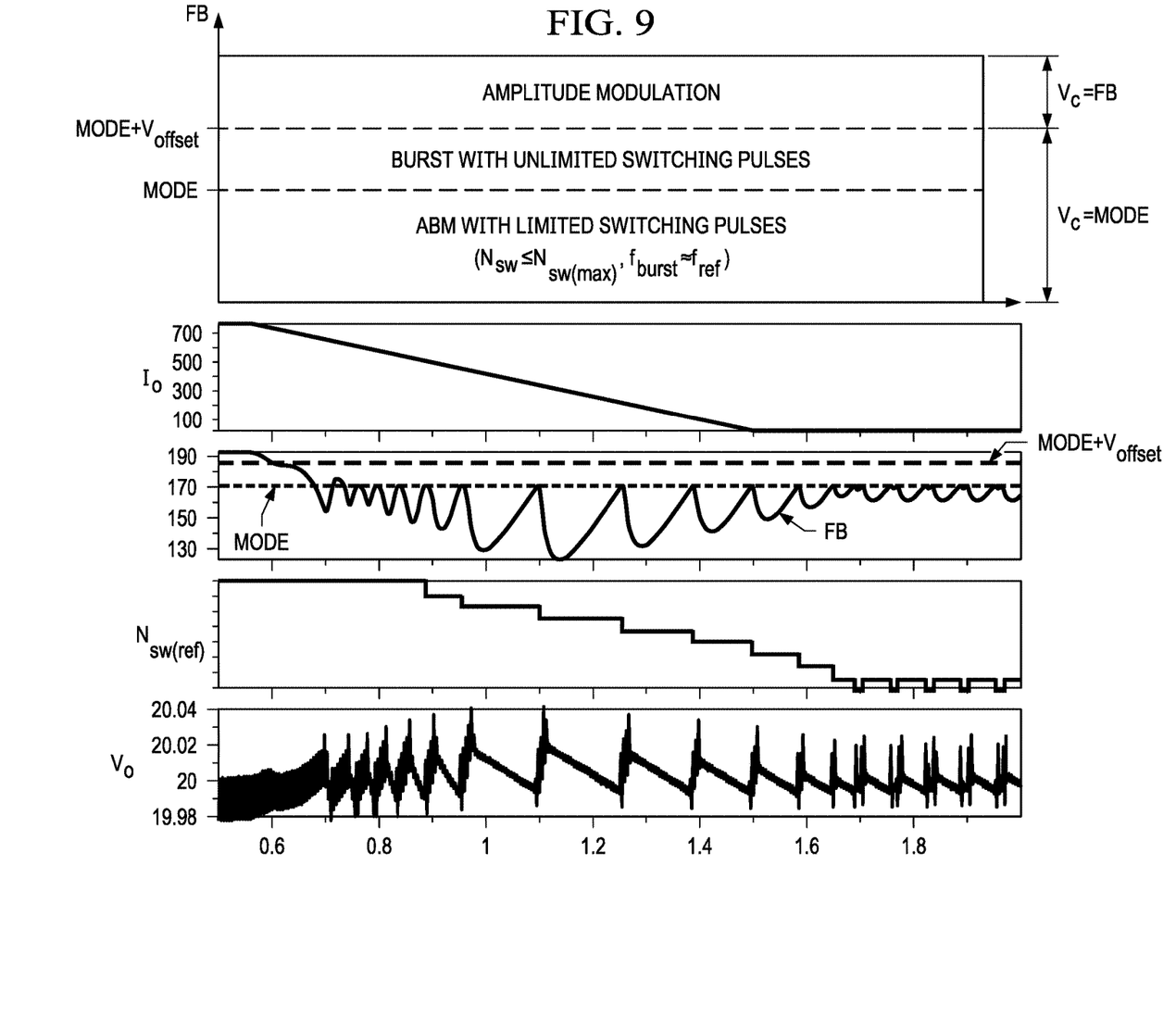
FIG. 9 comprises graphs as configured in accordance with various embodiments of these teachings.

These teachings will also readily accommodate including a mode transition technique if desired. In particular, as a transition mechanism when switching between the aforementioned amplitude modulation approach and the above-described adaptive burst approach (where $V_C$ equals MODE), the teachings will employ using bursts where unlimited switching pulses are permitted. FIG. 9 depicts an illustrative example in these regards where this "burst with unlimited switching pulses" approach occurs in a limited operating window between where FB equals MODE and MODE+$V_{offset}$ (where $V_{offset}$ is selected to best suit the needs of a given application setting). Using this approach provides a buffer between the other two modes and helps the mode transition itself become smoother.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A direct current (DC)-output converter comprising:
   a coupler configured to couple to a voltage regulator;
   an adaptive burst generator that operably couples to the voltage regulator via the coupler;
   a control circuit that operably couples to the voltage regulator via the coupler and that is configured to adjust a number of switching pulses per burst cycle as a function, at least in part, of output loading by controlling burst frequency with respect to at least one predetermined threshold frequency,
wherein the control circuit is configured to adjust a number of switching pulses per burst cycle by, at least in part, regulating a frequency of bursting with respect to the at least one predetermined threshold frequency by dynamically controlling a number of pulses in each burst package.

2. The DC-output converter of claim 1 wherein the DC-output converter comprises an alternating current (AC)-to-DC converter.

3. The DC-output converter of claim 1 wherein the predetermined threshold frequency comprises a non-audible frequency, such that the control circuit adjusts the number of switching pulses as a function of the output loading in order to prevent the burst frequency from constituting an audible signal.

4. The DC-output converter of claim 3 wherein the control circuit is configured to only adjust the number of switching pulses per burst cycle when the output loading is less than a predetermined level of loading.

5. The DC-output converter of claim 1 wherein the control circuit is further configured to dynamically control the number of pulses in each burst package while also clamping pulse frequency for the pulses in each burst package to a particular value.

6. The DC-output converter of claim 5 wherein the particular value constitutes a highest available switching frequency.

7. A method for use with a direct current (DC)-output converter comprising:
adjusting a number of switching pulse per burst as a function, at least in part, of output loading by controlling burst frequency with respect to at least one predetermined threshold frequency,
wherein adjusting the number of switching pulses per burst cycle comprises, at least in part, regulating a frequency of bursting with respect to the at least one predetermined threshold frequency by dynamically controlling a number of pulses in each burst package.

8. The method of claim 7 wherein the predetermined threshold frequency comprises a non-audible frequency, such that adjusting the number of switching pulses as a function of the output loading further comprises preventing the burst frequency from constituting an audible signal.

9. The method of claim 8 further comprising only adjusting the number of switching pulses per burst cycle when the output loading is less than a predetermined level of loading.

10. The method of claim 7 further comprising dynamically controlling the number of pulses in each burst package while also clamping pulse frequency for the pulses in each burst package to a particular value.

11. The method of claim 10 wherein the particular value constitutes a highest available switching frequency.

12. An integrated circuit comprising:
a direct current (DC)-output converter having a control circuit configured to adjust a number of switching pulses per burst cycle as a function, at least in part, of output loading by controlling burst frequency with respect to at least one predetermined threshold frequency,
wherein the control circuit is configured to adjust a number of switching pulses per burst cycle by, at least in part, regulating a frequency of bursting with respect to the at least one predetermined threshold frequency by dynamically controlling a number of pulses in each burst package.

13. The integrated circuit of claim 12 wherein the DC-output converter comprises an alternating current (AC)-to-DC converter.

14. The integrated circuit of claim 12 wherein the predetermined threshold frequency comprises a non-audible frequency, such that the control circuit adjusts the number of switching cycles as a function of the output loading in order to prevent the burst frequency from constituting an audible signal.

15. The integrated circuit of claim 14 wherein the control circuit is configured to only adjust the number of switching pulses per burst cycle when the output loading is less than a predetermined level of loading.

16. The integrated circuit of claim 12 wherein the control circuit is further configured to dynamically control the number of pulses in each burst package while also clamping pulse frequency for the pulses in each burst package to a particular value.

17. The integrated circuit of claim 16 wherein the particular value constitutes a highest available switching frequency.

* * * * *